United States Patent
Itagaki et al.

(10) Patent No.: US 8,907,622 B2
(45) Date of Patent: Dec. 9, 2014

(54) VEHICLE CHARGING SYSTEM AND ELECTRICALLY POWERED VEHICLE PROVIDED WITH THE SAME

(75) Inventors: Kenji Itagaki, Okazaki (JP); Wanleng Ang, Okazaki (JP); Yoshinobu Sugiyama, Toyota (JP); Yoshikazu Kataoka, Seto (JP); Naomi Matsumoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 437 days.

(21) Appl. No.: 13/390,195

(22) PCT Filed: Sep. 25, 2009

(86) PCT No.: PCT/JP2009/066598
§ 371 (c)(1),
(2), (4) Date: Feb. 13, 2012

(87) PCT Pub. No.: WO2011/036758
PCT Pub. Date: Mar. 31, 2011

(65) Prior Publication Data
US 2012/0169281 A1    Jul. 5, 2012

(51) Int. Cl.
*H02J 7/00* (2006.01)
*H02J 1/10* (2006.01)
*B60L 11/18* (2006.01)
*H02J 7/34* (2006.01)

(52) U.S. Cl.
CPC .......... B60L 11/1824 (2013.01); *Y02T 10/7005* (2013.01); H02J 1/10 (2013.01); *Y02T 10/705* (2013.01); *Y02T 10/7088* (2013.01); *Y02T 90/12* (2013.01); *B60L 2210/30* (2013.01); *Y02T 90/127* (2013.01); *H02J 7/34* (2013.01); B60L 11/1851 (2013.01); H02J 1/108 (2013.01); *Y02T 10/7241* (2013.01); H02J 7/0013 (2013.01); *Y02T 90/14* (2013.01); *Y02T 10/7055* (2013.01)
USPC ........................................................ 320/109

(58) Field of Classification Search
USPC ........................................................ 320/109
See application file for complete search history.

(56) References Cited

U.S. PATENT DOCUMENTS

| 7,057,376 B2 * | 6/2006 | Cook et al. ..................... 323/207 |
| 7,138,775 B2 * | 11/2006 | Sugimoto et al. ............. 318/140 |
| 7,332,891 B2 * | 2/2008 | Sugimoto ..................... 320/116 |

(Continued)

FOREIGN PATENT DOCUMENTS

| JP | A-9-19068 | 1/1997 |
| JP | A-2009-27774 | 2/2009 |

(Continued)

OTHER PUBLICATIONS

International Search Report issued in International Patent Application No. PCT/JP2009/066598 dated Dec. 22, 2009.

*Primary Examiner* — Edward Tso
*Assistant Examiner* — Ramy Ramadan
(74) *Attorney, Agent, or Firm* — Oliff PLC

(57) ABSTRACT

An AC/DC converter is configured to perform voltage conversion on power supplied from an AC power supply and supply the power to an auxiliary load during external charging in which a main power storage device is charged by the AC power supply. An auxiliary power storage device stores power to be supplied to the auxiliary load. A diode permits discharging of the auxiliary power storage device while preventing charging of the auxiliary power storage device during the external charging. A current sensor detects discharging of the auxiliary power storage device. A controller adjusts an output voltage of the AC/DC converter while confirming whether or not the auxiliary power storage device discharges, based on a detection value of the current sensor.

7 Claims, 9 Drawing Sheets

(56) References Cited

U.S. PATENT DOCUMENTS 7,573,236 B2 * 8/2009 Sugimoto .................... 320/132
7,863,838 B2 * 1/2011 Aso .............................. 318/139
8,417,400 B2 * 4/2013 Toth .............................. 701/22

FOREIGN PATENT DOCUMENTS

JP  A-2009-131077  6/2009
WO  WO 2011/024285 A1  3/2011

* cited by examiner

|  | SMR | RL1 | RL2 |
|---|---|---|---|
| DURING EXTERNAL CHARGING | OFF | ON | OFF |
| DURING OPERATION OF VEHICLE | ON | OFF | ON |

FIG.9

| SMR | RL1 | RL2 | AC/DC | MAIN DC/DC |
|-----|-----|-----|-------|------------|
| ON | ON | OFF | IN OPERATION | IN OPERATION |

US 8,907,622 B2

VEHICLE CHARGING SYSTEM AND ELECTRICALLY POWERED VEHICLE PROVIDED WITH THE SAME

TECHNICAL FIELD

The present invention relates to a vehicle charging system and an electrically powered vehicle provided with the same, and in particular to a vehicle charging system configured to be capable of charging a power storage device mounted in a vehicle by an external power supply external to the vehicle, and an electrically powered vehicle provided with the same.

BACKGROUND ART

Electric vehicles, hybrid vehicles, fuel cell vehicles, and the like are known as electrically powered vehicles configured to be capable of driving an electric motor for driving a vehicle using power stored in an on-vehicle power storage device represented by a secondary battery. For these electrically powered vehicles, configurations of charging an on-vehicle power storage device by a power supply external to a vehicle (hereinafter also simply referred to as an "external power supply"; further, charging of an on-vehicle power storage device by an external power supply will be also simply referred to as "external charging") have been proposed.

Japanese Patent Laying-Open No. 2009-27774 (PTL 1) discloses a vehicle having an improved charging efficiency during external charging. The vehicle includes a battery that can be charged by an external power supply, a DC/DC converter that lowers a voltage from the battery and outputs it, an auxiliary battery that is charged by the output voltage of the DC/DC converter and supplies power to an auxiliary load, and a control device. The control device causes the DC/DC converter to operate continuously during operation of the vehicle, and causes the DC/DC converter to operate intermittently during external charging.

According to the vehicle, since the DC/DC converter is caused to operate intermittently during external charging, charging of a power storage device can be performed while suppressing loss during external charging (see PTL 1).

CITATION LIST

Patent Literature

PTL 1: Japanese Patent Laying-Open No. 2009-27774

SUMMARY OF INVENTION

Technical Problem

In the vehicle disclosed in the above publication, loss during external charging is suppressed and charging efficiency is improved by causing the DC/DC converter, which generates an auxiliary voltage during operation of the vehicle, to operate intermittently during external charging. However, during external charging, only a controller performing charge control and some of auxiliaries for such as minimum necessary display functions operate, and required auxiliary power is smaller than that during operation of the vehicle. Therefore, it is inefficient to use a large DC/DC converter used during operation of the vehicle, during low-load external charging.

Further, if the auxiliary battery is charged during external charging, power is consumed by internal resistance of the auxiliary battery, and loss is caused. Therefore, it is desirable that, during external charging, only required auxiliary power can be supplied without charging the auxiliary battery.

In addition, since power consumed by the resistance component of the auxiliary load and the like is proportional to the square of voltage, if an auxiliary voltage during external charging is high, power consumption by the auxiliary load is increased correspondingly, and charging efficiency is deteriorated.

Thus, the present invention has been made to solve such a problem, and one object of the present invention is to provide a vehicle charging system that can achieve further improvement in charging efficiency during external charging, and an electrically powered vehicle provided with the same.

Solution to Problem

According to the present invention, a charging system is a vehicle charging system configured to be capable of charging a power storage device mounted in a vehicle by an external power supply external to the vehicle, including a converter, an auxiliary power supply, a diode, a current sensor, and a control device. The converter is configured to perform voltage conversion on power supplied from the external power supply and supply the power to an auxiliary load during external charging in which the power storage device is charged by the external power supply. The auxiliary power supply stores power to be supplied to the auxiliary load. The diode permits discharging of the auxiliary power supply while preventing charging of the auxiliary power supply during the external charging. The current sensor detects discharging of the auxiliary power supply. The control device adjusts an output voltage of the converter while confirming whether or not the auxiliary power supply discharges, based on a detection value of the current sensor.

Preferably, if the detection value of the current sensor is zero, the control device controls the converter to decrease the output voltage of the converter.

More preferably, if the detection value of the current sensor is not zero, the control device controls the converter to increase the output voltage of the converter.

Preferably, if an abnormality in the current sensor is detected, the control device controls the converter to set the output voltage of the converter to a predetermined maximum value.

Preferably, the charging system further includes a DC/DC converter. The DC/DC converter is configured to perform voltage conversion on power output from the power storage device and supply the power to the auxiliary load at system start-up that allows the vehicle to travel. If operating power for the auxiliary load is not supplied sufficiently by the converter during the external charging, the DC/DC converter further operates.

Preferably, the external power supply is an alternating current (AC) power supply, and the converter is composed of an AC/DC converter.

Further, according to the present invention, an electrically powered vehicle includes any charging system described above, and a vehicle drive system generating travel torque using power stored in the power storage device charged by the charging system.

Advantageous Effects of Invention

In the present invention, since the diode permitting discharging of the auxiliary power supply while preventing charging of the auxiliary power supply during the external charging is provided, charging of the auxiliary power supply is not performed during external charging. Further, since the current sensor detecting discharging of the auxiliary power supply is provided, and the output voltage of the converter is adjusted while confirming whether or not the auxiliary power supply discharges, based on the detection value of the current sensor, it is possible to lower the output voltage of the converter, that is, a supply voltage to the auxiliary load, in a range where the auxiliary power supply does not discharge during external charging. Therefore, according to the present invention, further improvement in charging efficiency during external charging can be achieved.

BRIEF DESCRIPTION OF DRAWINGS

FIG. 9 is a table for illustrating operation states of associated devices in a case where operating power for an auxiliary load is insufficient.

DESCRIPTION OF EMBODIMENTS

Figure 1:
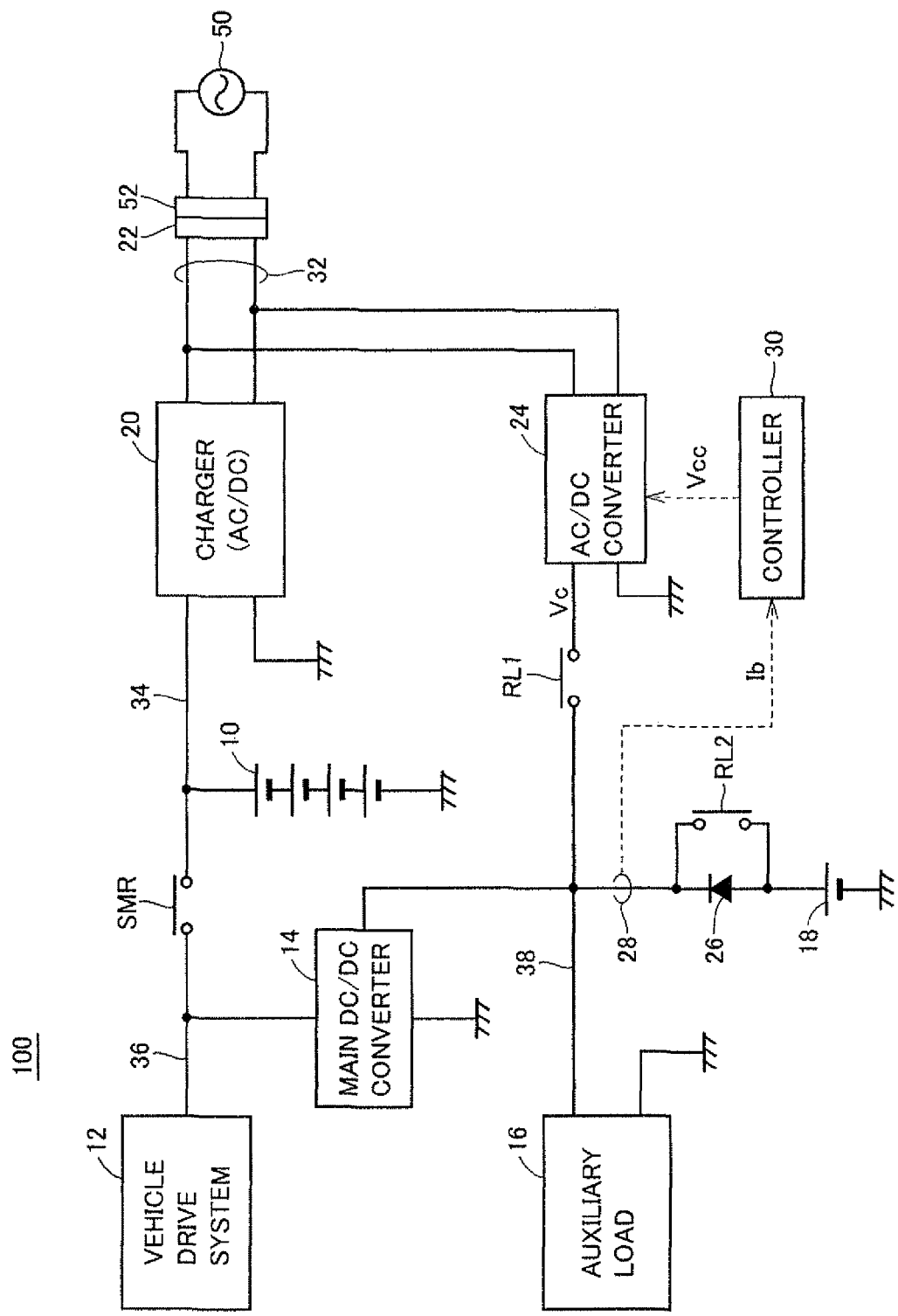
FIG. 1 is an overall block diagram of an electrically powered vehicle to which a charging system according to Embodiment I of the present invention is applied.

Hereinafter, embodiments of the present invention will be described in detail with reference to the drawings, in which identical or corresponding parts will be designated by the same reference numerals, and the description thereof will not be repeated.

[Embodiment 1]

FIG. 1 is an overall block diagram of an electrically powered vehicle to which a charging system according to Embodiment 1 of the present invention is applied. Referring to FIG. 1, an electrically powered vehicle 100 includes a main power storage device 10, a system main relay SMR, a vehicle drive system 12, a main DC/DC converter 14, an auxiliary load 16, and an auxiliary power storage device 18. Further, electrically powered vehicle 100 also includes a charger 20, a charge inlet 22, an AC/DC converter 24, a diode 26, a current sensor 28, relays RL1, RL2, and a controller 30.

Main power storage device 10 is connected to a power supply line 34, and system main relay SMR is connected between power supply line 34 and a power supply line 36 to which vehicle drive system 12 is connected. Main DC/DC converter 14 is connected between power supply line 36 and an auxiliary power supply line 38. Auxiliary load 16 is connected to auxiliary power supply line 38. Auxiliary power storage device 18 is connected to auxiliary power supply line 38 via diode 26. More specifically, a positive electrode of auxiliary power storage device 18 is connected to an anode of diode 26, and a cathode of diode 26 is connected to auxiliary power supply line 38. Relay RL2 is connected in parallel to diode 26.

Further, charger 20 is connected between power supply line 34 and charge inlet 22. AC/DC converter 24 is connected to a power supply line 32 provided between charger 20 and charge inlet 22, and an output end of AC/DC converter 24 is connected to auxiliary power supply line 38 via relay RL1.

Main power storage device 10 is a rechargeable direct-current (DC) power supply, and is composed of, for example, a secondary battery such as a nickel hydride battery and a lithium ion battery. When system main relay SMR is ON, main power storage device 10 supplies power to vehicle drive system 12 and main DC/DC converter 14. Further, main power storage device 10 is charged by receiving regenerative power generated by vehicle drive system 12 during braking of the vehicle. Furthermore, main power storage device 10 is charged by charger 20 while electrically powered vehicle 100 is charged by an AC power supply 50 (for example, a commercial system power supply) external to the vehicle (i.e., during external charging). A large-capacity capacitor can also be employed as main power storage device 10, and any power buffer may be used as long as it can temporarily store regenerative power received from vehicle drive system 12 and power supplied from AC power supply 50 and supply the stored power to vehicle drive system 12 and main DC/DC converter 14.

System main relay SMR is ON at system start-up that allows the vehicle to travel (hereinafter also simply referred to as "during operation of the vehicle"), and OFF during external charging. Vehicle drive system 12 receives supply of power from main power storage device 10 and generates vehicle drive force. Specifically, vehicle drive system 12 includes an electric motor generating vehicle drive force, and an inverter driving the electric motor by receiving supply of power from main power storage device 10 (both not shown). Vehicle drive system 12 may further include a boost converter that can boost a voltage of power output from main power storage device 10 and supply the power to the inverter. In addition, vehicle drive system 12 may further include an engine generating vehicle drive force, and a power generator generating electric power using motive power of the engine (such a system is generally called "hybrid system"). Alternatively, vehicle drive system 12 may use an engine as a main motive power source, and use the above electric motor to assist the engine as necessary.

During operation of the vehicle, main DC/DC converter 14 converts power output from main power storage device 10 to have a voltage level of auxiliary load 16, and supplies it to auxiliary load 16 and auxiliary power storage device 18.

Auxiliary load 16 includes various auxiliaries mounted in the vehicle. During external charging, only controller 30 (described later) performing charge control and some of the auxiliaries for such as minimum necessary display functions operate, and the magnitude of load in auxiliary load 16 during external charging is smaller than that of load during operation of the vehicle. Auxiliary load 16 receives supply of power from main DC/DC converter 14 and auxiliary power storage device 18 during operation of the vehicle, and receives supply of power from AC/DC converter 24 (described later) during external charging.

Auxiliary power storage device 18 is a rechargeable DC power supply, and is composed of, for example, a lead battery. During operation of the vehicle, auxiliary power storage device 18 supplies power to auxiliary load 16 via diode 26 and relay RL2 that is ON during operation of the vehicle, and when its power storage amount is decreased, auxiliary power storage device 18 is charged by main DC/DC converter 14. During external charging, charging of auxiliary power storage device 18 is prohibited by turning off relay RL2, and a voltage of auxiliary power supply line 38 is adjusted by AC/DC converter 24 such that auxiliary power storage device 18 does not discharge, as described later.

On the other hand, charge inlet 22 is configured to be capable of being connected to a connector 52 connected to AC power supply 50 external to the vehicle, and receives AC power supplied from AC power supply 50. During external charging, charger 20 converts the AC power supplied from AC power supply 50 to have a predetermined charge voltage (DC) and charges main power storage device 10. Charger 20 is composed of, for example, a known AC/DC converter.

During external charging, AC/DC converter 24 converts the AC power supplied from AC power supply 50 to have a voltage level (DC) of auxiliary load 16, and supplies it to auxiliary load 16. Here, AC/DC converter 24 controls an output voltage Vc of AC/DC converter 24 to a voltage command value Vcc, in accordance with voltage command value Vcc given from controller 30. Since only controller 30 and some of the auxiliaries for such as minimum necessary display functions operate during external charging as described above, and required auxiliary power is smaller than that during operation of the vehicle, a converter smaller than main DC/DC converter 14 generating an auxiliary voltage during operation of the vehicle is employed as AC/DC converter 24.

Relay RL1 is OFF during operation of the vehicle, and is ON during external charging. Diode 26 is provided to permit discharging of auxiliary power storage device 18 while preventing charging of auxiliary power storage device 18 during external charging. Specifically, during external charging, relay RL2 is OFF, and thereby energization from auxiliary power supply line 38 to auxiliary power storage device 18 is prevented, and energization from auxiliary power storage device 18 to auxiliary power supply line 38 is permitted.

Current sensor 28 detects a current Ib output from auxiliary power storage device 18, and outputs a detection value thereof to controller 30. Current sensor 28 is provided to detect discharging of auxiliary power storage device 18 during external charging. If the voltage of auxiliary power supply line 38 (i.e., output voltage Vc of AC/DC converter 24) is lower than a voltage of auxiliary power storage device 18, a non-zero current is detected by current sensor 28. In contrast, if the voltage of auxiliary power supply line 38 is higher than the voltage of auxiliary power storage device 18, a zero current is detected by current sensor 28.

Controller 30 receives the detection value of current Ib from current sensor 28. Then, during external charging, controller 30 adjusts output voltage Vc of AC/DC converter 24 while confirming whether or not auxiliary power storage device 18 discharges, based on the detection value of current Ib, by a method described later. More specifically, controller 30 sets voltage command value Vcc indicating a target value for output voltage Vc of AC/DC converter 24, based on the detection value of current Ib, to set output voltage Vc of the converter as low as possible in a range where auxiliary power storage device 18 does not discharge. Then, controller 30 outputs the set voltage command value Vcc to AC/DC converter 24.

Figures 2, 3:
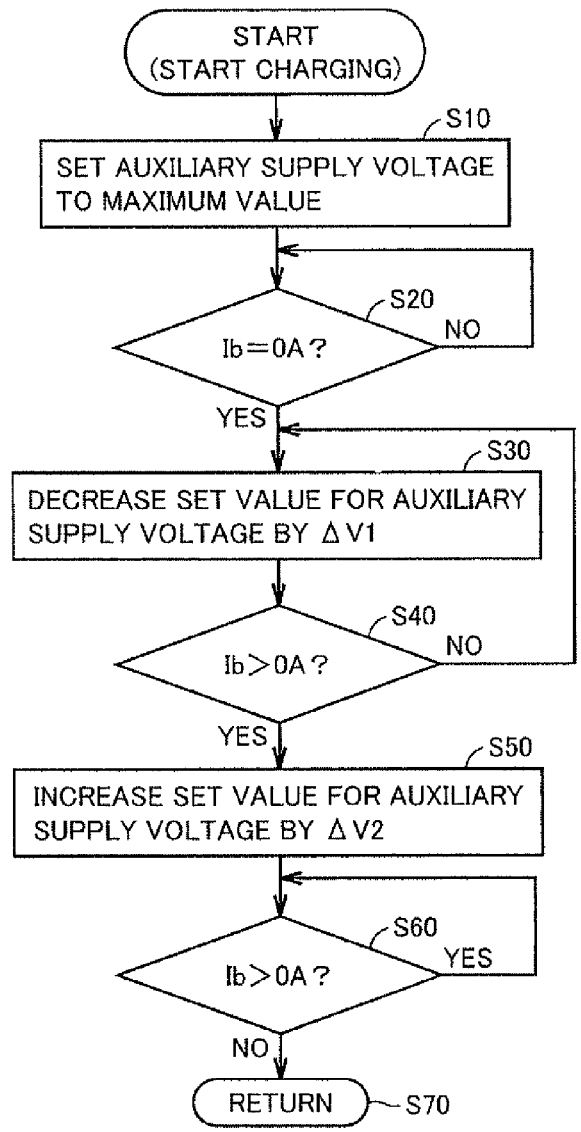
FIG. 2 is a table for illustrating ON/OFF of a system main relay and relays shown in FIG. 1.
FIG. 3 is a flowchart for illustrating a control structure of a controller shown in FIG. 1.

FIG. 2 is a table for illustrating ON/OFF of system main relay SMR and relays RL1, RL2 shown in FIG. 1. Referring to FIG. 2, during external charging, system main relay SMR is OFF, and relays RL1 and RL2 are ON and OFF, respectively. Thus, during external charging, power is supplied from AC/DC converter 24 to auxiliary load 16, and auxiliary power storage device 18 is not charged.

In contrast, during operation of the vehicle, system main relay SMR is ON, and relays RL1 and RL2 are OFF and ON, respectively. Thus, during operation of the vehicle, AC/DC converter 24 is electrically separated from auxiliary power supply line 38, and power is supplied from main DC/DC converter 14 and auxiliary power storage device 18 to auxiliary load 16. Further, if the charge amount of auxiliary power storage device 18 is decreased, auxiliary power storage device 18 is charged by main DC/DC converter 14.

Referring to FIG. 1 again, in Embodiment 1, AC/DC converter 24 connected between charge inlet 22 and auxiliary power supply line 38 is provided, and power is supplied from AC/DC converter 24 to auxiliary load 16 during external charging. As AC/DC converter 24, a converter smaller than main DC/DC converter 14 is employed.

Further, diode 26 and relay RL2 connected in parallel thereto are provided between auxiliary power storage device 18 and auxiliary power supply line 38, and relay RL2 is OFF during external charging. Thereby, charging of auxiliary power storage device 18 is prevented during external charging.

In addition, current sensor 28 detecting current Ib output from auxiliary power storage device 18 is provided. Controller 30 sets voltage command value Vcc indicating the target value for output voltage Vc of AC/DC converter 24, based on the detection value of current Ib, to set output voltage Vc of AC/DC converter 24 as low as possible in the range where auxiliary power storage device 18 does not discharge during external charging, by a method described later. Thereby, the auxiliary voltage can be set as low as possible while preventing charging and discharging of auxiliary power storage device 18 during external charging, and power consumption by auxiliary load 16 during external charging can be minimized.

FIG. 3 is a flowchart for illustrating a control structure of controller 30 shown in FIG. 1. Referring to FIG. 3, when external charging is started, controller 30 sets a voltage to be supplied to the auxiliaries by AC/DC converter 24 (an auxiliary supply voltage), that is, output voltage Vc of AC/DC converter 24, to a predetermined maximum value (step S10). More specifically, controller 30 sets voltage command value Vcc indicating the target value for output voltage Vc of AC/DC converter 24, to a predetermined value fully higher than the voltage of auxiliary power storage device 18.

Subsequently, controller 30 determines whether or not current Ib detected by current sensor 28 is 0 amperes (A) (step S20). Specifically, controller 30 determines whether or not a discharge current of auxiliary power storage device 18 is 0. If controller 30 determines that current Ib is 0 A (YES in step S20), controller 30 decreases the set value for the auxiliary supply voltage by $\Delta V1$ (step S30). More specifically, controller 30 decreases voltage command value Vcc by $\Delta V1$.

Thereafter, controller 30 determines whether or not current Ib is greater than 0 A (step S40). Specifically, controller 30 determines whether or not auxiliary power storage device 18 discharges. If controller 30 determines that current Ib is not greater than 0 A, that is, current Ib is 0 A (NO in step S40), the process returns to step S30, and voltage command value Vcc is decreased again by $\Delta V1$.

If controller 30 determines in step S40 that current Ib is greater than 0 A (YES in step S40), controller 30 increases the set value for the auxiliary supply voltage by $\Delta V2$ (step S50). More specifically, controller 30 increases voltage command value Vcc by $\Delta V2$.

Thereafter, controller 30 determines again whether or not current Ib is greater than 0 A (step S60). Specifically, controller 30 determines whether or not auxiliary power storage device 18 discharges. If controller 30 determines that current Ib is not greater than 0 A, that is, current Ib is 0 A (NO in step S60), the process proceeds to step S70, and a series of steps is completed.

Through the process as described above, the voltage to be supplied from AC/DC converter 24 to auxiliary load 16 can be set as low as possible in the range where auxiliary power storage device 18 does not discharge. As a result, power consumption by auxiliary load 16 during external charging is suppressed, and charging efficiency is improved.

It is to be noted that, in a case where variation in the voltage of auxiliary power storage device 18 (i.e., reduction to a stable voltage) is expected, such as in a case where external charging is performed immediately after auxiliary power storage device 18 is fully charged during operation of the vehicle, a series of steps shown in FIG. 3 may be repeatedly performed until the voltage of auxiliary power storage device 18 is stabilized.

Figure 4:
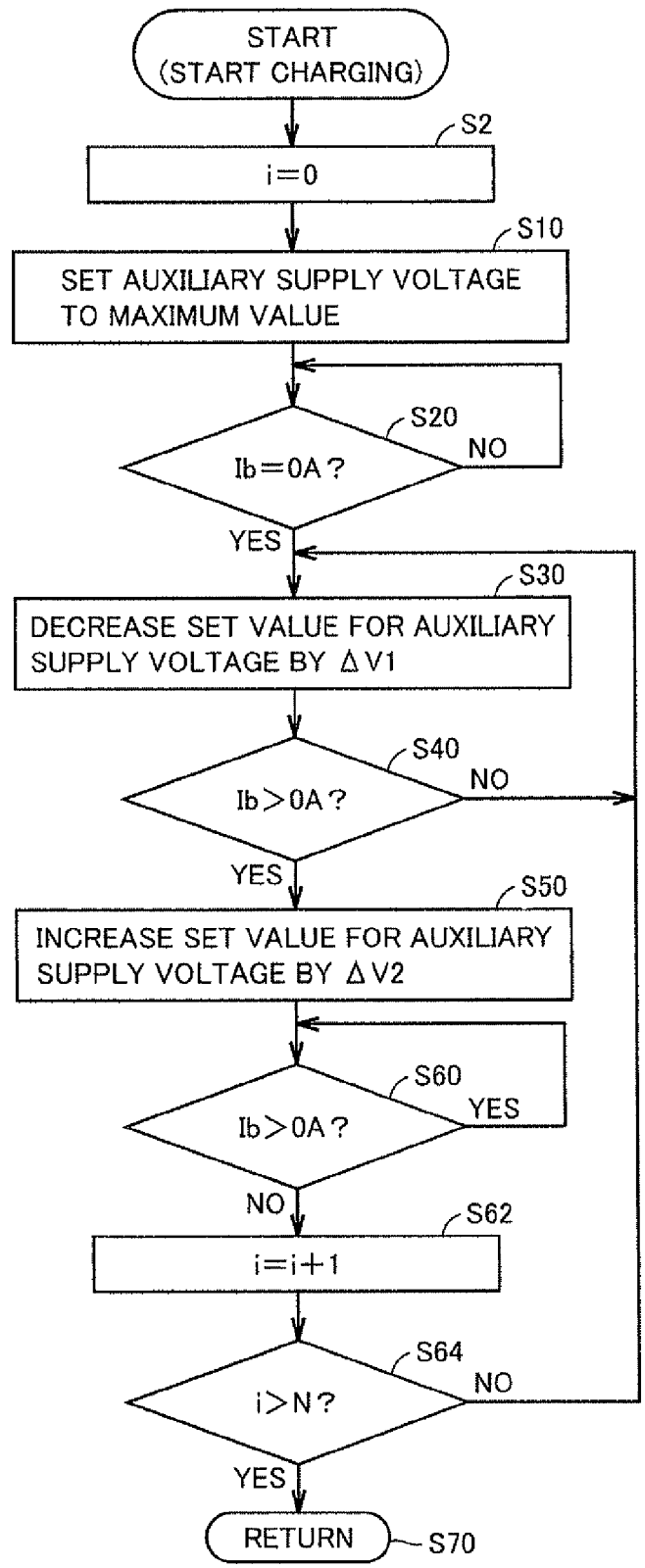
FIG. 4 is a flowchart for repeatedly performing a series of steps shown in FIG. 3 a predetermined number of times until a voltage of an auxiliary power storage device is stabilized.

FIG. 4 is a flowchart for repeatedly performing a series of steps shown in FIG. 3 a predetermined number of times until the voltage of auxiliary power storage device 18 is stabilized. Referring to FIG. 4, the flowchart further includes steps S2, S62, and S64, in the flowchart shown in FIG. 3. Specifically, when external charging is started, controller 30 sets 0 to a counter i (step S2). Thereafter, the process proceeds to step S10.

Further, if controller 30 determines in step S60 that current Ib is not greater than 0 A, that is, current Ib is 0 A (NO in step S60), controller 30 adds 1 to counter i (step S62). Thereafter, controller 30 determines whether or not counter i is greater than a predetermined value N (step S64). Predetermined value N is designed in accordance with a time period required until the voltage of auxiliary power storage device 18 is stabilized.

If counter i is not more than N (NO in step S64), the process returns to step S30, and the set value for the auxiliary supply voltage is changed again. In contrast, if controller 30 determines in step S64 that counter i is greater than N (YES in step S64), the process proceeds to step S70, and a series of steps is completed.

Although FIG. 4 illustrates the case where a series of steps shown in FIG. 3 is repeatedly performed a predetermined number of times, the series of steps may be repeatedly performed for a time period, instead of the number of times of processing.

Figure 5:
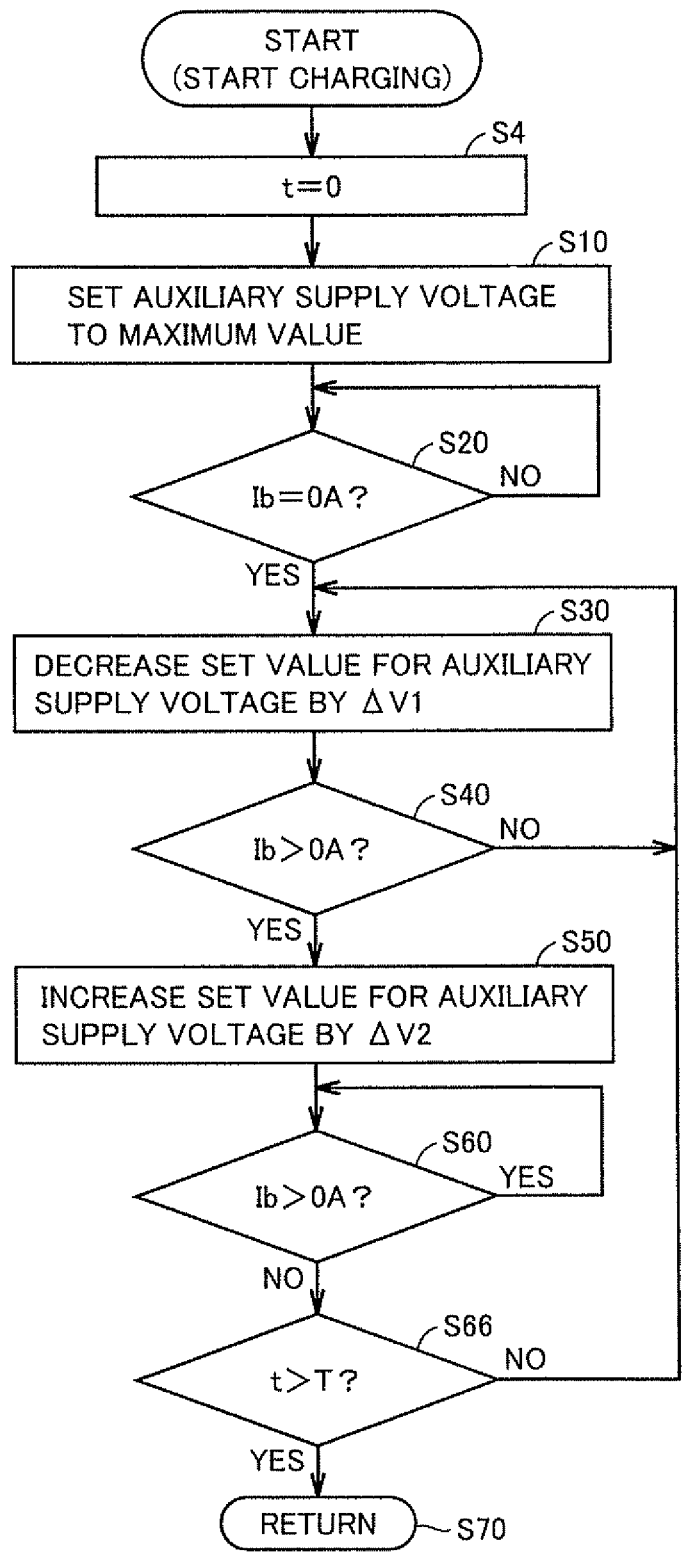
FIG. 5 is a flowchart for repeatedly performing a series of steps shown in FIG. 3 for a predetermined time period until the voltage of the auxiliary power storage device is stabilized.

FIG. 5 is a flowchart for repeatedly performing a series of steps shown in FIG. 3 for a predetermined time period until the voltage of auxiliary power storage device 18 is stabilized. Referring to FIG. 5, the flowchart further includes steps S4 and S66, in the flowchart shown in FIG. 3. Specifically, when external charging is started, controller 30 sets 0 as a timer value t (step S4). Thereafter, the process proceeds to step S10.

Further, if controller 30 determines in step S60 that current Ib is not greater than 0 A, that is, current Ib is 0 A (NO in step S60), controller 30 determines whether or not timer value t is greater than a predetermined time period T (step S66). Predetermined time period T is a time period required until the voltage of auxiliary power storage device 18 is stabilized.

If timer value t is not more than predetermined time period T (NO in step S66), the process returns to step S30, and the set value for the auxiliary supply voltage is changed again. In contrast, if controller 30 determines in step S66 that timer value t is greater than predetermined time period T (YES in step S66), the process proceeds to step S70, and a series of steps is completed.

As described above, in Embodiment 1, since diode 26 is provided, charging of auxiliary power storage device 18 is not performed during external charging. Further, current sensor 28 detecting discharging of auxiliary power storage device 18 is provided, and output voltage Vc of AC/DC converter 24 is adjusted while confirming whether or not auxiliary power storage device 18 discharges, based on the detection value of current sensor 28. More specifically, AC/DC converter 24 is controlled by controller 30 based on the detection value of current sensor 28 to lower output voltage Vc of AC/DC converter 24, that is, the supply voltage to auxiliary load 16, in the range where auxiliary power storage device 18 does not discharge. Therefore, according to Embodiment 1, further improvement in charging efficiency during external charging can be achieved.

[Embodiment 2]

In Embodiment 1, during external charging, whether or not auxiliary power storage device 18 discharges is sensed by current sensor 28, and the voltage to be supplied from AC/DC converter 24 to auxiliary load 16 is set as low as possible in the range where auxiliary power storage device 18 does not discharge. Thus, if current sensor 28 has an abnormality, current sensor 28 cannot sense whether or not auxiliary power storage device 18 discharges, which makes it impossible to determine to what level the auxiliary supply voltage (i.e., the output voltage of AC/DC converter 24) may be lowered. Therefore, in Embodiment 2, if an abnormality in current sensor 28 is sensed, the output voltage of AC/DC converter 24 is set to a predetermined maximum value.

An electrically powered vehicle according to Embodiment 2 has an overall configuration identical to that of electrically powered vehicle 1 according to Embodiment 1 shown in FIG. 1.

Figure 6:
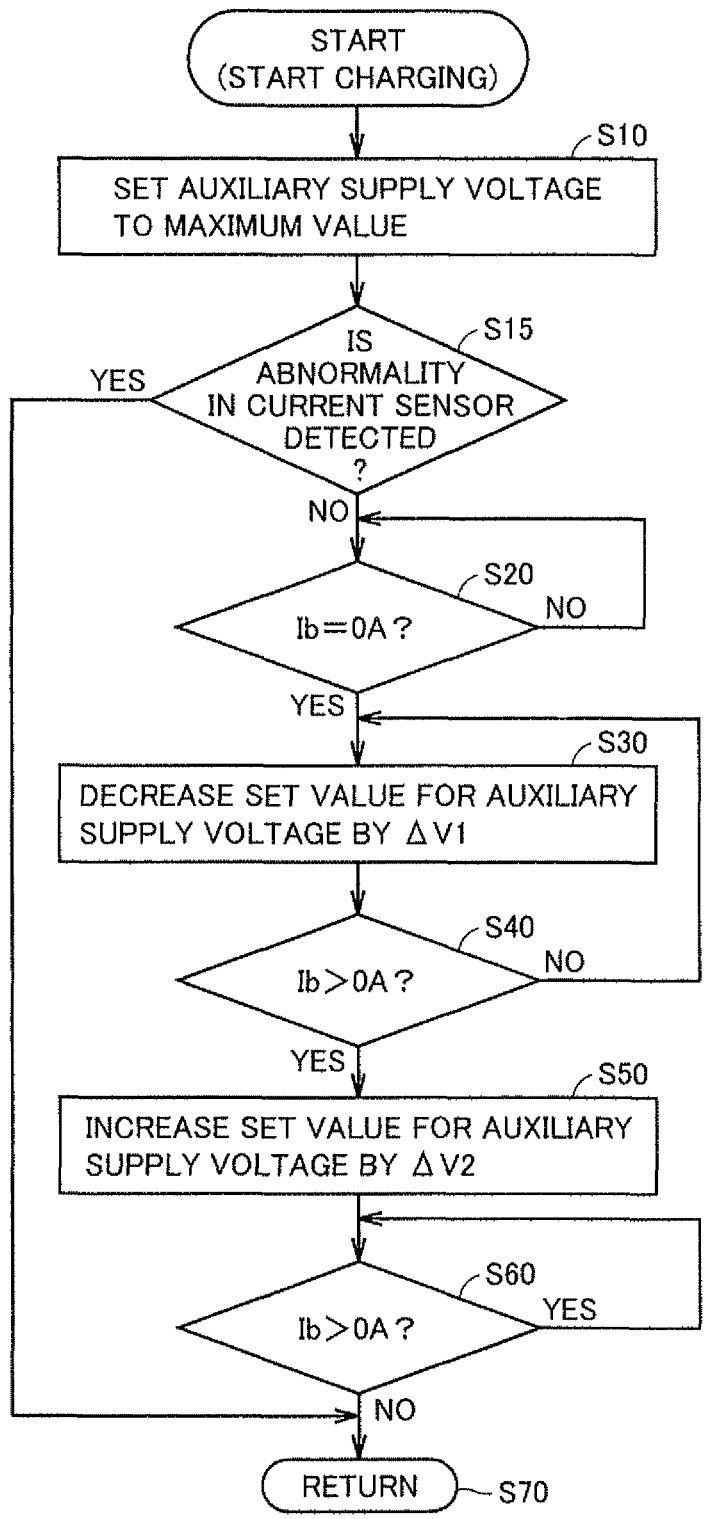
FIG. 6 is a flowchart for illustrating a control structure of a controller according to Embodiment 2.

FIG. 6 is a flowchart for illustrating a control structure of controller 30 according to Embodiment 2. Referring to FIG. 6, the flowchart further includes step S15, in the flowchart shown in FIG. 3. Specifically, if the auxiliary supply voltage, that is, output voltage Vc of AC/DC converter 24, is set to a predetermined maximum value in step S10, controller 30 determines whether or not an abnormality in current sensor 28 is detected (step S15). An abnormality in current sensor 28 may be detected by a self-diagnosis function of current sensor 28, or may be detected by controller 30 based on a detection signal from current sensor 28.

If controller 30 determines in step S15 that an abnormality in current sensor 28 is detected (YES in step S15), controller 30 advances the process to step S70 without performing subsequent steps. Specifically, in this case, voltage command value Vcc is set to the predetermined maximum value (step S10), and output voltage Vc of AC/DC converter 24 (the auxiliary supply voltage) is controlled to the maximum value. If an abnormality in current sensor 28 is not detected in step S15 (NO in step S15), the process proceeds to step S20.

Figure 7:
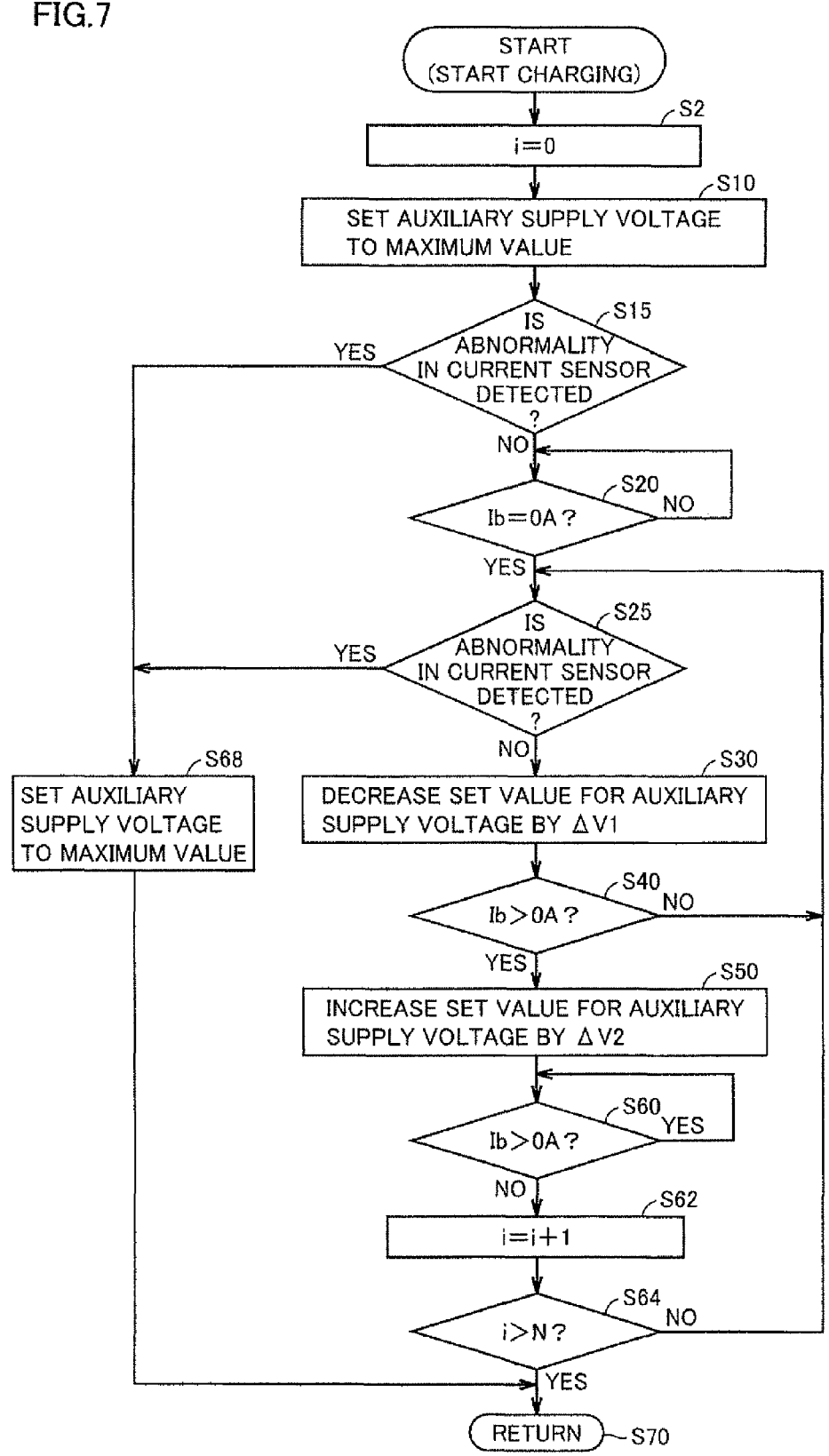
FIG. 7 is a flowchart for repeatedly performing a series of steps shown in FIG. 6 a predetermined number of times until the voltage of the auxiliary power storage device is stabilized.

FIG. 7 is a flowchart for repeatedly performing a series of steps shown in FIG. 6 a predetermined number of times until the voltage of auxiliary power storage device 18 is stabilized. Referring to FIG. 7, the flowchart further includes steps S2, S25, S62, S64, and S68, in the flowchart shown in FIG. 6. Steps S2, S62, and S64 are as described in FIG. 4.

If controller 30 determines in step S20 that current Ib is 0 A (YES in step S20), controller 30 determines whether or not an abnormality in current sensor 28 is detected (step S25). If controller 30 determines that an abnormality in current sensor 28 is detected (YES in step S25), controller 30 advances the process to step S68. If an abnormality in current sensor 28 is not detected (NO in step S25), the process proceeds to step S30.

If controller 30 determines in step S15 or S25 that an abnormality in current sensor 28 is detected (YES in step S15 or S25), controller 30 sets the auxiliary supply voltage, that is, output voltage Vc of AC/DC converter 24, to the predetermined maximum value (step S68). More specifically, controller 30 sets voltage command value Vcc to the predetermined value fully higher than the voltage of auxiliary power storage device 18. Thereafter, controller 30 advances the process to step S70.

If it is determined in step S64 that counter i is not more than N (NO in step S64), the process returns to step S25, and whether or not an abnormality in current sensor 28 is detected is determined again.

Figure 8:
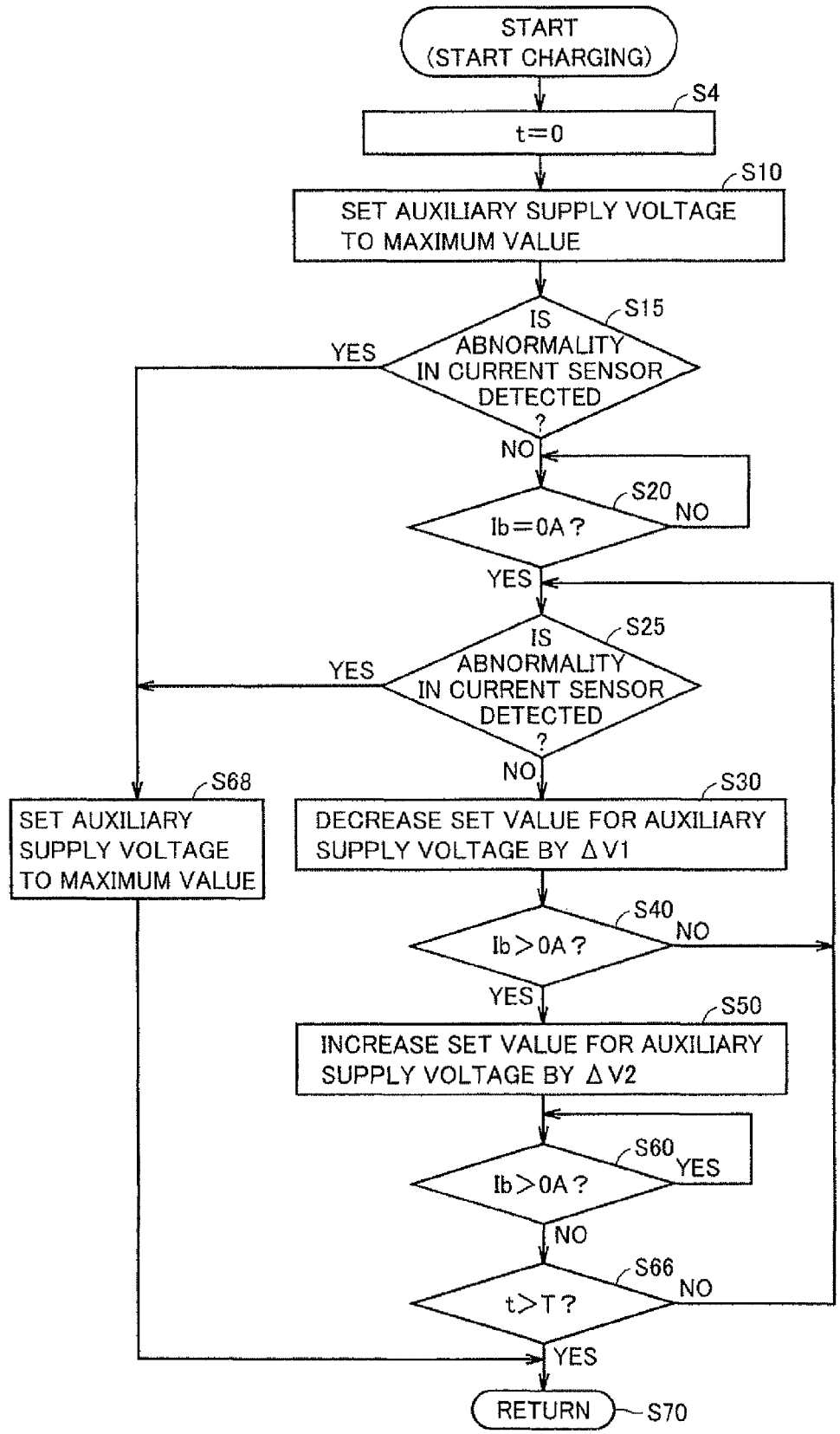
FIG. 8 is a flowchart for repeatedly performing a series of steps shown in FIG. 6 for a predetermined time period until the voltage of the auxiliary power storage device is stabilized.

FIG. 8 is a flowchart for repeatedly performing a series of steps shown in FIG. 6 for a predetermined time period until the voltage of auxiliary power storage device 18 is stabilized. Referring to FIG. 8, the flowchart further includes steps S4, S25, S66, and S68, in the flowchart shown in FIG. 6. Specifically, if it is determined in step S66 that timer value t is not more than predetermined time period T (NO in step S66), the process returns to step S25, and whether or not an abnormality in current sensor 28 is detected is determined again.

If it is determined in step S15 or S25 that an abnormality in current sensor 28 is detected (YES in step S15 or S25), the process proceeds to step S68, and the auxiliary supply voltage is set to the predetermined maximum value.

As described above, according to Embodiment 2, if an abnormality in current sensor 28 is sensed, the auxiliary supply voltage (i.e., output voltage Vc of AC/DC converter 24) is set to the predetermined maximum value. This can prevent auxiliary power storage device 18 from discharging due to an abnormality in current sensor 28.

[Embodiment 3]

In Embodiment 3, if operating power for auxiliary load 16 is not supplied sufficiently by AC/DC converter 24 due to load variation in auxiliary load 16 during external charging, main DC/DC converter 14 is caused to operate.

FIG. 9 is a table for illustrating operation states of associated devices in a case where operating power for auxiliary load 16 is insufficient. Referring to FIG. 9, if operating power for auxiliary load 16 becomes insufficient during external charging, system main relay SMR is turned ON, and relays RL1 and RL2 are turned ON and OFF, respectively. Then, main DC/DC converter 14 also operates in addition to operation of AC/DC converter 24.

Thereby, in addition to a route through which auxiliary power is supplied from AC power supply 50 external to the vehicle via AC/DC converter 24, a route through which auxiliary power is supplied from AC power supply 50 via charger 20, system main relay SMR, and main DC/DC converter 14 in succession is also obtained, and required power can be supplied from AC power supply 50 to auxiliary load 16.

According to Embodiment 3, if operating power for auxiliary load 16 is not supplied sufficiently by AC/DC converter 24 due to load variation in auxiliary load 16 during external charging, main DC/DC converter 14 is caused to operate. Therefore, discharging of auxiliary power storage device 18 can be prevented while ensuring operating power for auxiliary load 16.

[Embodiment 4]

Embodiment 4 shows a configuration in which a DC/DC converter is provided instead of AC/DC converter 24 described above in a case where the external power supply is a DC power supply.

Figure 10:
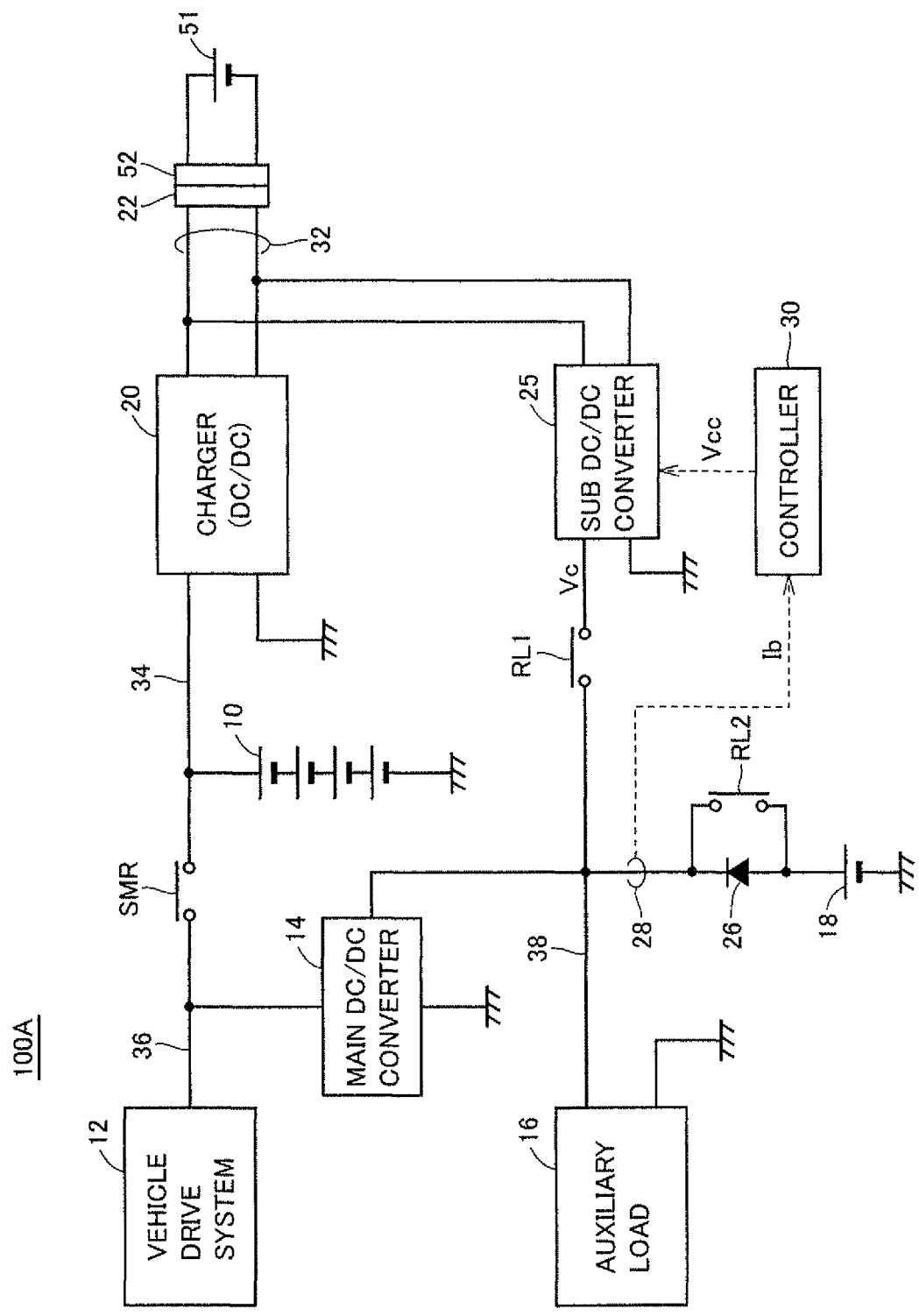
FIG. 10 is an overall block diagram of an electrically powered vehicle to which a charging system according to Embodiment 4 is applied.

FIG. 10 is an overall block diagram of an electrically powered vehicle to which a charging system according to Embodiment 4 is applied. Referring to FIG. 10, an electrically powered vehicle 100A includes a sub DC/DC converter 25, instead of AC/DC converter 24, in the configuration of electrically powered vehicle 100 shown in FIG. 1.

During external charging, sub DC/DC converter 25 converts DC power supplied from a DC power supply 51 external to the vehicle to have a voltage level of auxiliary load 16, and supplies it to auxiliary load 16. Here, sub DC/DC converter 25 controls output voltage Vc of sub DC/DC converter 25 to voltage command value Vcc, in accordance with voltage command value Vcc given from controller 30. As sub DC/DC converter 25, a converter smaller than main DC/DC converter 14 generating the auxiliary voltage during operation of the vehicle is employed, as with AC/DC converter 24.

Other than that, electrically powered vehicle 100A has a configuration identical to that of electrically powered vehicle 100. Also according to Embodiment 4, an effect identical to those in Embodiments 1 to 3 described above can be obtained.

It is to be noted that, in the above embodiments, AC/DC converter 24 corresponds to one practical example of the "converter" in the present invention, and sub DC/DC converter 25 also corresponds to one practical example of the "converter" in the present invention. Further, auxiliary power storage device 18 corresponds to one practical example of the "auxiliary power supply" in the present invention, and controller 30 corresponds to one practical example of the "control device" in the present invention. Furthermore, main DC/DC converter 14 corresponds to one practical example of the "DC/DC converter" in the present invention.

It should be understood that the embodiments disclosed herein are illustrative and non-restrictive in every respect. The scope of the present invention is defined by the scope of the claims, rather than the above description of the embodiments, and is intended to include any modifications within the scope and meaning equivalent to the scope of the claims.

Reference Signs List

10: main power storage device, 12: vehicle drive system, 14: main DC/DC converter, 16: auxiliary load, 18: auxiliary power storage device, 20: charger, 22: charge inlet, 24: AC/DC converter, 25: sub DC/DC converter, 26: diode, 28: current sensor, 30: controller, 32, 34, 36: power supply line, 38: auxiliary power supply line, 50: AC power supply, 51: DC power supply, 52: connector, 100, 100A: electrically powered vehicle, SMR: system main relay, RL1, RL2: relay.

The invention claimed is:

1. A vehicle charging system configured to be capable of charging a power storage device mounted in a vehicle by an external power supply external to the vehicle, comprising:

a converter configured to perform voltage conversion on power supplied from said external power supply and supply the power to an auxiliary load during external charging in which said power storage device is charged by said external power supply;

an auxiliary power supply storing power to be supplied to said auxiliary load;

a diode for permitting discharging of said auxiliary power supply while preventing charging of said auxiliary power supply during said external charging;

a current sensor for detecting discharging of said auxiliary power supply; and a control device for adjusting an output voltage of said converter while confirming whether or not said auxiliary power supply discharges, based on a detection value of said current sensor.

2. The vehicle charging system according to claim 1, wherein, if the detection value of said current sensor is zero, said control device controls said converter to decrease the output voltage of said converter.

3. The vehicle charging system according to claim 2, wherein, if the detection value of said current sensor is not zero, said control device controls said converter to increase the output voltage of said converter.

4. The vehicle charging system according to claim 1, wherein, if an abnormality in said current sensor is detected, said control device controls said converter to set the output voltage of said converter to a predetermined maximum value.

5. The vehicle charging system according to claim 1, further comprising a DC/DC converter configured to perform voltage conversion on power output from said power storage device and supply the power to said auxiliary load at system start-up that allows the vehicle to travel,
   wherein, if operating power for said auxiliary load is not supplied sufficiently by said converter during said external charging, said DC/DC converter further operates.

6. The vehicle charging system according to claim 1, wherein
   said external power supply is an AC power supply, and
   said converter is composed of an AC/DC converter.

7. An electrically powered vehicle, comprising:
   the charging system according to claim 1; and
   a vehicle drive system generating travel torque using power stored in the power storage device charged by said charging system.

* * * * *